United States Patent [19]
Beaman

[11] Patent Number: 5,829,891
[45] Date of Patent: Nov. 3, 1998

[54] MOUNTING FOR STEERING COLUMN

[75] Inventor: Michael D. Beaman, Torrington, Conn.

[73] Assignee: The Torrington Company, Torrington, Conn.

[21] Appl. No.: 898,301

[22] Filed: Jul. 22, 1997

[51] Int. Cl.[6] .................................................. F16C 19/08
[52] U.S. Cl. ............................................ 384/495; 384/518
[58] Field of Search .................................. 384/495, 518, 384/517, 563, 558

[56]  References Cited

U.S. PATENT DOCUMENTS

| | | | |
|---|---|---|---|
| 4,541,742 | 9/1985 | Lederman | 384/518 |
| 5,531,526 | 7/1996 | Labedan et al. | 384/536 |
| 5,609,423 | 3/1997 | Jurik et al. | 384/538 |

*Primary Examiner*—Lenard A. Footland
*Attorney, Agent, or Firm*—John C. Bigler

[57] ABSTRACT

A large chamfer on the outer race mates with a matching angled step in the housing bore and eliminates the need for the press fit while still meeting the application requirements. Alternative designs reduce the rotational effort and torque variation of the system and facilitate assembly. The mating tapers give the bearings freedom to self-align and thereby avoid common "clicking" noise.

20 Claims, 4 Drawing Sheets

MOUNTING FOR STEERING COLUMN

BACKGROUND OF THE INVENTION

This invention relates generally to the mounting of a rotatable shaft within a housing and, more particularly, to a mounting suitable for a steering column shaft.

Typically, automotive upper tilt steering columns require a spring preload to eliminate axial free play and a tolerance ring to eliminate radial free play. Currently, a steel coil spring or wave type spring is used in combination with a steel or plastic tolerance ring. This mounting arrangement requires a great amount of axial space and introduces variations in torque-to-rotate. Additionally, such mounting arrangements allow transmission of noise and vibration to or from the shaft, through the bearing.

Angular contact ball bearings used in such steering columns must be fixed axially and have no radial free play. Currently, the outer rings of the bearings are pressfit into a housing against a stepped shoulder. The interference fit eliminates the outer ring-housing clearance, and the step gives a positive stop for the bearing to seat against. However, the large range of interference causes raceway distortion due to the nonuniform wall thickness of the housing, and, as a result, does not allow the outer raceway to self-align.

More specifically, many steering column housings of this type are cast, having wall sections around the bearings are relatively thin with strengthening gussets in a few locations. When a round outer ring is pressed into a round housing bore with varying wall thickness as described above, the resulting raceway is distorted. The distortion is proportional to the amount of interference. Typically, the bearing rings and housing bores are formed or machined without tight tolerances.

Since such steering column housings are formed of magnesium or aluminum, with a higher coefficient of thermal expansion than the steel outer ring, additional interference is designed into the system to maintain an interference fit throughout a temperature range. The large stack-up can result in an interference of 0.007 inch or more. This large amount of interference distorts the installed outer raceway due to the varying housing wall thickness which increases and induces variation in the rotational effort of the system. In addition, a "click" may occur due to misaligned raceways.

The foregoing illustrates limitations known to exist in present devices and methods. Thus, it is apparent that it would be advantageous to provide an alternative directed to overcoming one or more of the limitations set forth above. accordingly, a suitable alternative is provided including features more fully disclosed hereinafter.

SUMMARY OF THE INVENTION

In one aspect of the invention, this is accomplished by providing A steering column assembly comprising a housing having a bore with first and second bearing seats axially spaced along an axis. Each bearing seat is tapered such that the diameter of the bore tapers radially inwardly in the axially inward direction. First and second angular contact bearings have first and second outer rings seated on the first and second bearing seats, respectively, and first and second inner rings, respectively. A shaft extends through the bore of the housing and has a third bearing seat tapered radially inwardly in a direction toward the axial center of the housing such that one of the first and second inner rings is seated on the third bearing seat. Biasing means biases at least one of the first and second angular contact bearings such that the first and second angular contact bearings are preloaded and are axially aligned with the three bearing seats.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
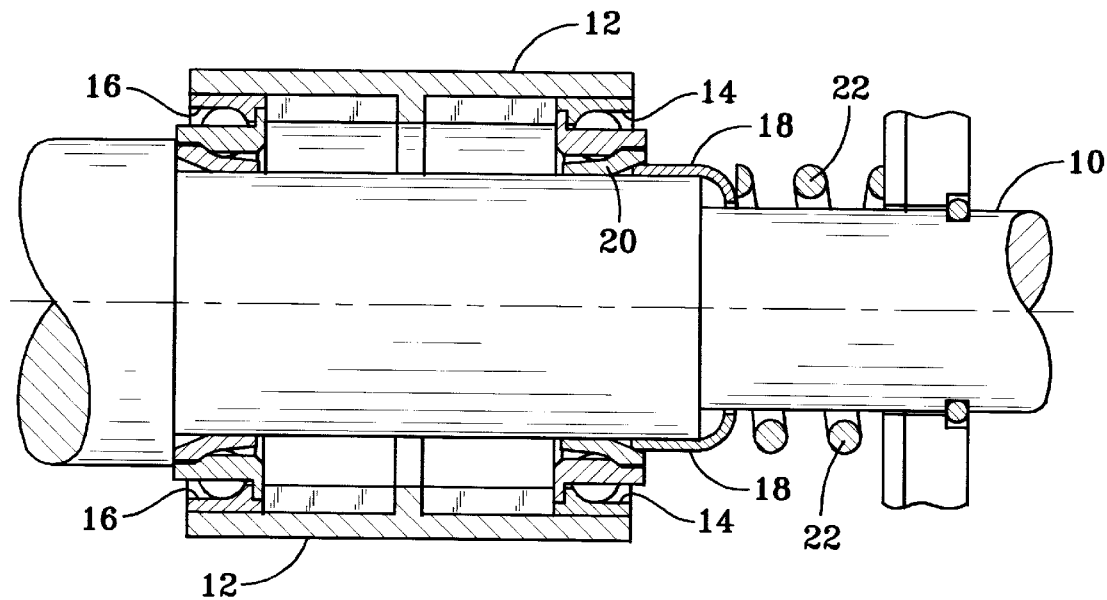
FIG. 1 is a sectional view of a shaft mounted within a housing illustrating the prior art.

Referring now to the drawings, FIG. 1 illustrates shaft 10 mounted within housing 12 by angular contact bearings 14 and 16. Steel tolerance ring 18 is split or segmented so that it can close radially inwardly against shaft 10 and under a tapered portion of bearing inner ring 20 of angular contact bearing 14 to reduce radial free play between shaft 10 and bearing inner ring 20. Steel coil spring 22 provides an axial preload on angular contact bearings 14 and 16 by pressing axially against steel tolerance ring 18.

Figure 2:
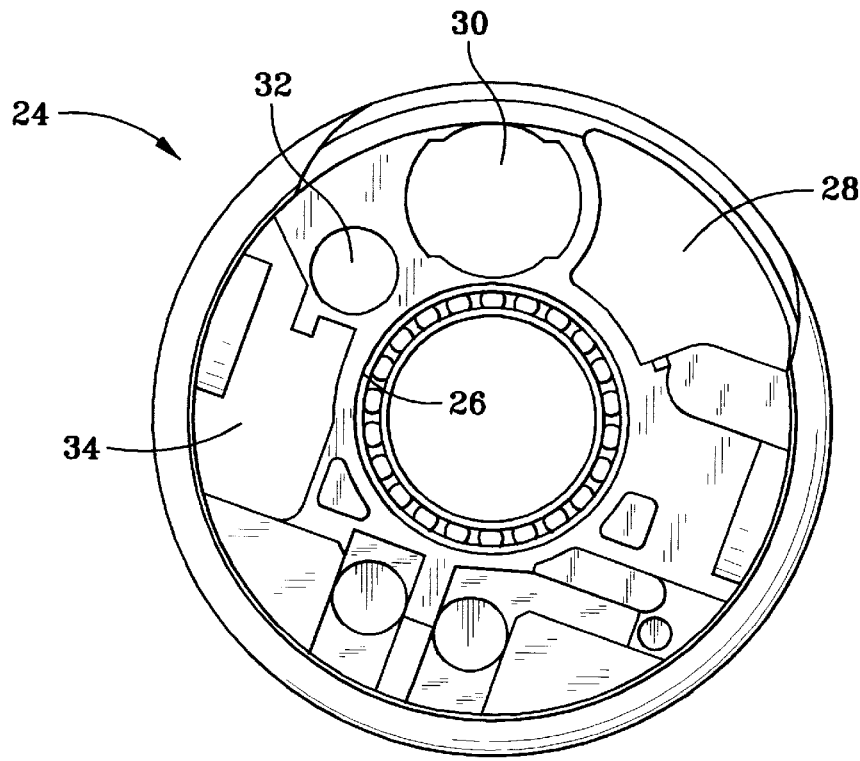
FIG. 2 is an end view of a steering column housing illustrating the prior art.

FIG. 2 illustrates one particular prior art steering column housing 24 having a central bore 26 and openings 28, 30, 32 and 34 to accommodate various components. Housing 24 is cast of aluminum or magnesium with strengthening ribs and mounting supports of various configurations. In this example, crush bushings 36 are formed in the bore to facilitate an interference fit with a bearing outer ring with a minimum of distortion of the outer ring.

Figure 3:
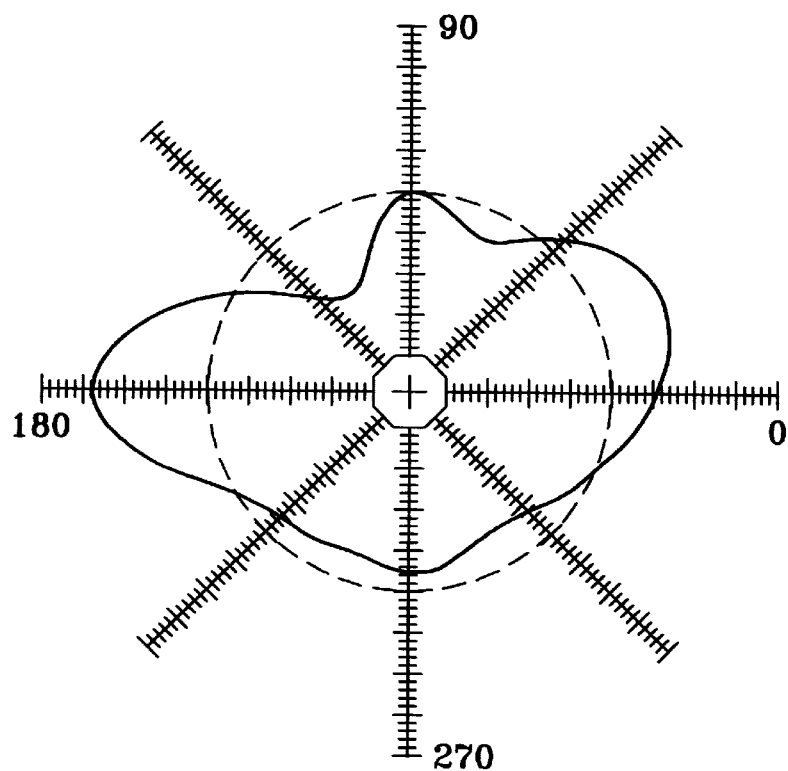
FIG. 3 is a graphical representation indicating the roundness of the outer ring of a bearing installed in the steering column housing of FIG. 2.

FIG. 3 is a graphical representation of the distortion of an outer ring of a bearing when pressed into housing 24. The elongated portions of the graph at approximately 30 degrees and 180 degrees correspond to thin sections of the wall of housing 24.

Figure 4:
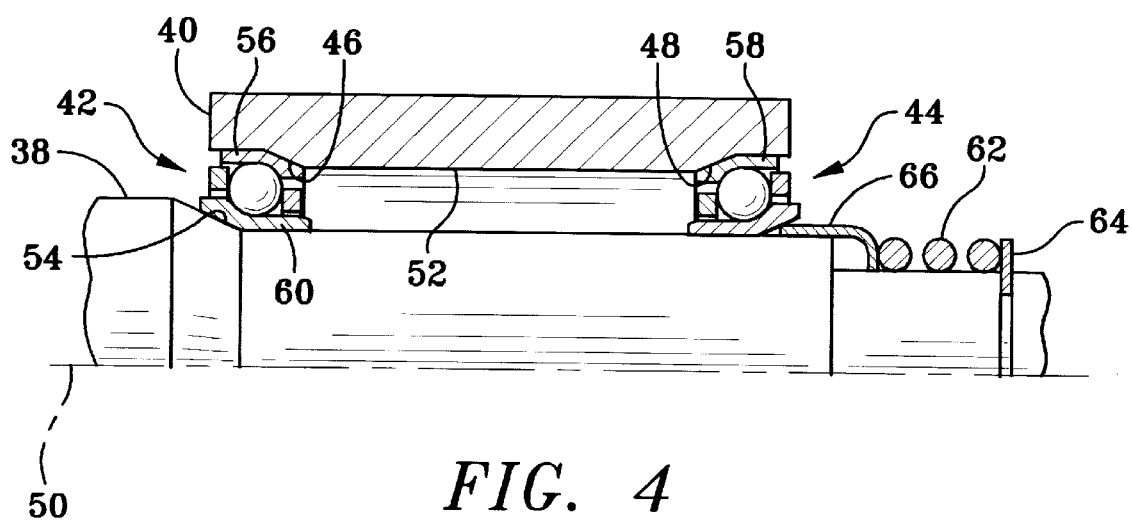
FIG. 4 is a sectional view of a shaft mounted within a housing, illustrating a first embodiment of the present invention.

A first embodiment of the present invention is illustrated in FIG. 4 in which shaft 38 is mounted within housing 40 by angular first and second angular contact bearings 42 and 44. First and second bearing seats 46 and 48 of housing 40 are axially spaced along axis 50 and are tapered such that the diameter of bore 52 tapers radially inwardly in the axially inward direction. Shaft 38 extends through bore 52 of housing 40 and has third bearing seat 54 that is tapered radially inwardly in a direction toward the axial center of housing 40.

Angular contact bearings 42 and 44 have first and second outer rings 56 and 58 seated on first and second bearing seats 46 and 48, respectively, and first inner ring 60 seated on third bearing seat 54. Helical coil spring 62 abuts snap ring 64 and applies an axially inward (with respect to housing 40) force on split tolerance ring 66. As a result of this force, angular contact bearings 42 and 44 are axially aligned with the three tapered bearing seats 46, 48 and 54 and are preloaded.

Preferably, angular contact bearings 42 and 44 have inner and outer rings with tapered surfaces corresponding to the tapered bearing seats on which they are positioned, as illustrated in this first embodiment. Such configuration may be formed by coining or machining, for example. However, at least some of the benefits of the tapered bearing seats may be realized with inner or outer rings having rounded (not conically tapered) surfaces that engage the tapered bearing seats.

Figure 5:
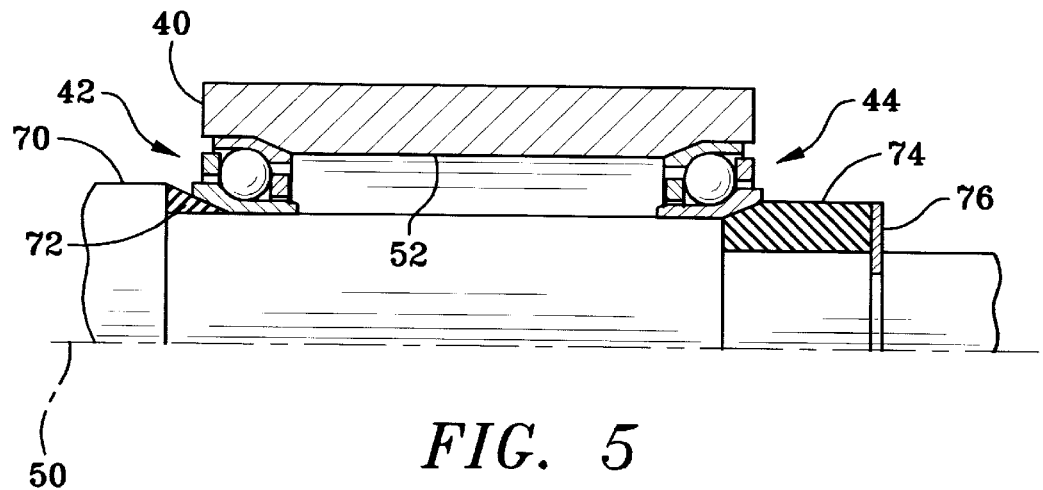
FIGS. 5 through 10 are sectional views of a shaft mounted within a housing, illustrating alternative embodiments of the present invention.

FIG. 5 illustrates a second embodiment of the present invention similar to that of FIG. 4 but having shaft 70 with third bearing seat 72 formed of an elastomeric polymer, such as urethane, for example, and an alternative biasing means. Mounting ring 74, formed of an elastomeric polymer, such as urethan, for example, is compressed axially between snap ring 76 and inner ring 68, in place of helical spring 62, to provide the desired force to align and preload angular contact bearings 42 and 44.

Figure 6:
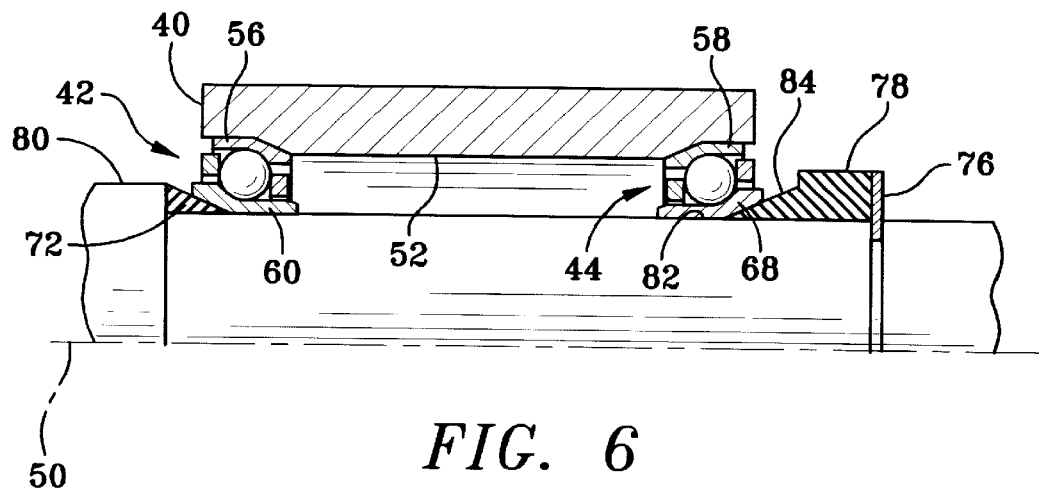

The third embodiment illustrated in FIG. 6 is similar to the embodiment of FIG. 5, including resilient third bearing seat 72, but has resilient mounting ring 78 of a different configuration. Instead of being recessed within shaft 80, mounting ring 78 is positioned over a cylindrical portion of shaft 80 that is in alignment with fourth bearing seat 82. Mounting ring 80 is formed of an elastomeric polymer, such as urethan, for example, and includes wedge shaped portion 84 for engaging a corresponding tapered portion of inner ring 68.

Figure 7:
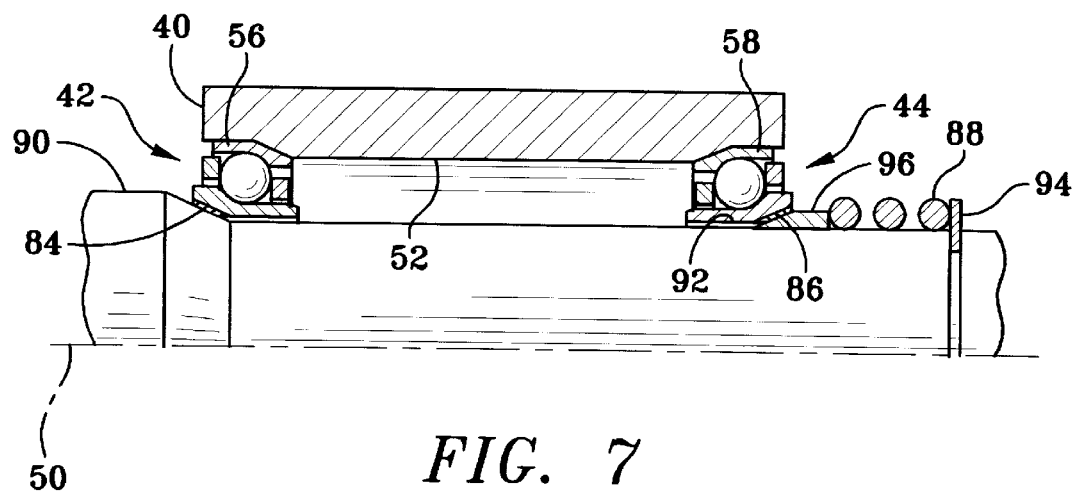

The embodiment illustrated in FIG. 7 is similar to the embodiment of FIG. 4, but includes a thin layer or film 84 and 86 of elastomeric polymer, such as urethane, for example, on inner rings 60 and 68 and includes and alternative arrangement for the biasing spring. Helical spring 88 is not recessed within shaft 90, as in the earlier embodiment, but is on a cylindrical portion of shaft 90 in alignment with fourth bearing seat 92. Helical spring 88 is compressed axially between snap ring 94 and split wedge ring 96 to supply the desired axial force to align and preload angular contact bearings 42 and 44.

Figure 8:
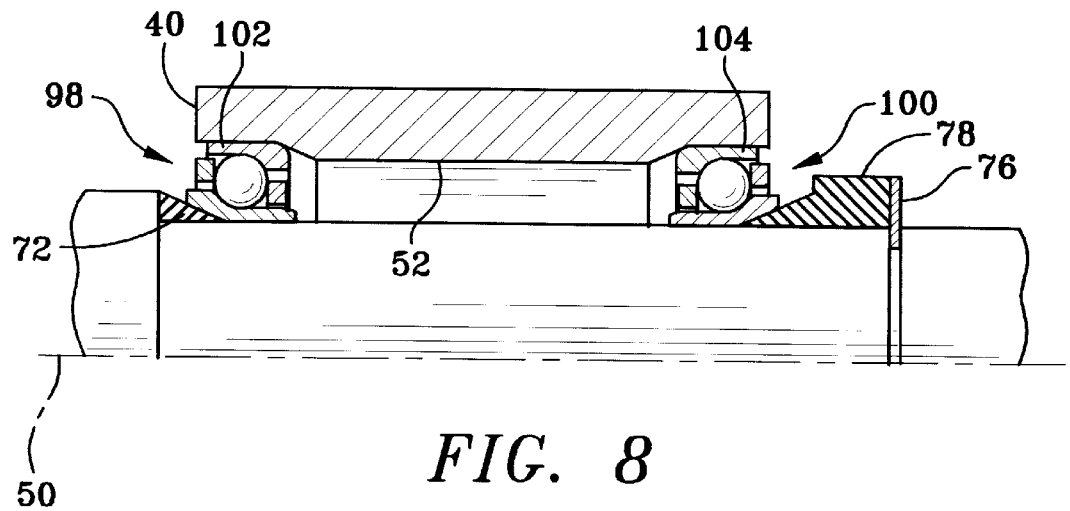

FIG. 8 illustrates that the configuration of FIG. 6 may be utilized with first and second angular contact bearings 98 and 100 with first and second outer rings 102 and 104, respectively, having a rounded portion engaging an intermediate diameter of tapered bearing seats 46 and 48. As stated earlier, the used of such bearings may achieve at least part of the advantages that may be achieved with the preferred bearings having tapered portions engaging the tapered bearing seats.

Figure 9:
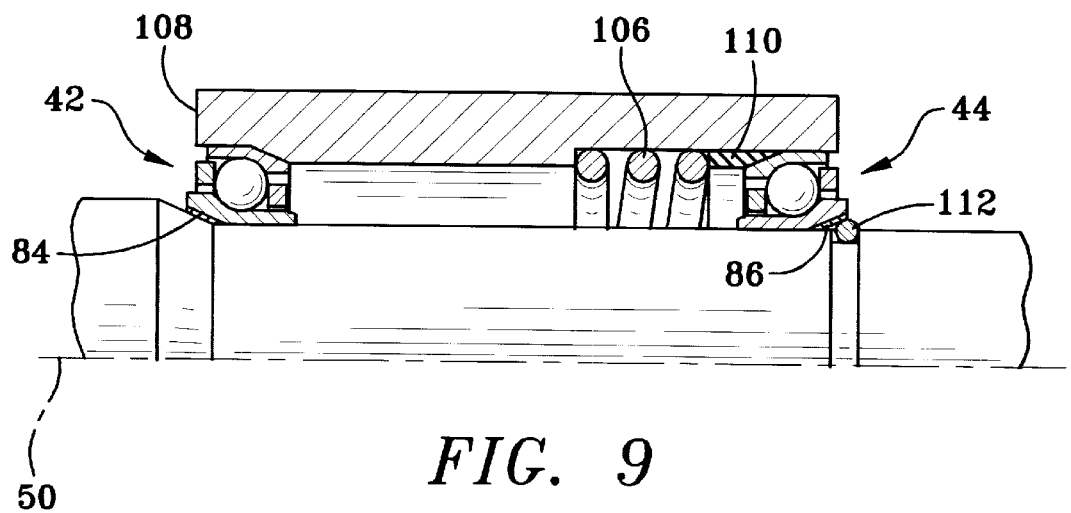
Figure 10:
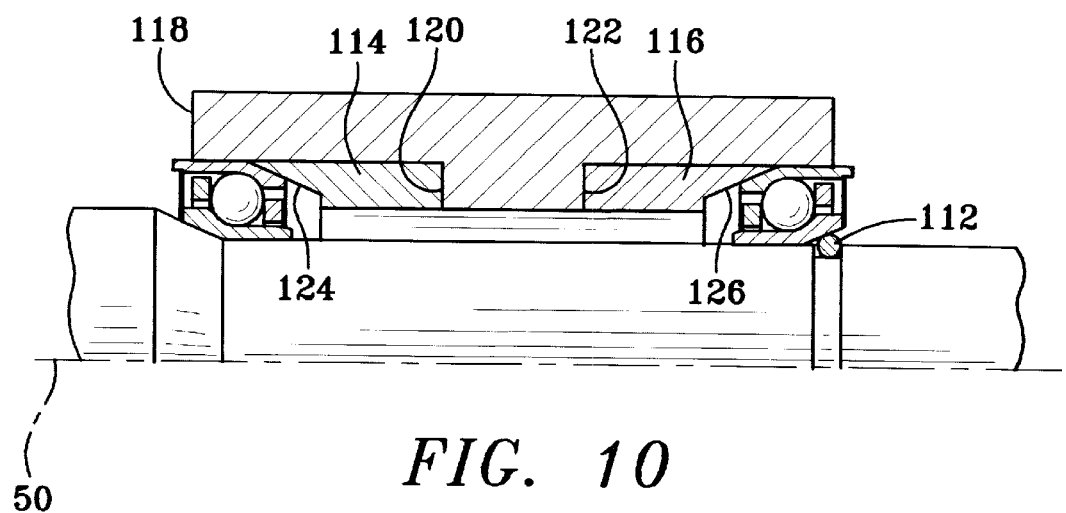

FIGS. 9 and 10 illustrate alternative embodiments in which the biasing means is positioned on the housing, exerting an axially outward force on at least one of the angular contact bearings, instead of on the shaft, exerting an axially inward force on one of the angular contact bearings. In FIG. 9, helical coil spring 106, mounted on housing 108, exerts an axial force on wedge ring 110 that engages outer ring 58. Snap ring 112, having a round cross section, provides a portion of a bearing seat for angular contact bearing 44 and facilitates alignment of inner ring 68. As in FIG. 7, film 84 and 86 is provided on inner rings 60 and 68.

The embodiment of FIG. 10 utilizes mounting rings 114 and 116 similar to mounting ring 78 of the embodiment of FIGS. 6 and 8, but they are positioned on housing 118 instead of on the shaft. Mounting rings 114 and 116 abut stop surfaces 120 and 122, respectively, of housing 118 and provide axially outward force on both angular contact bearings 42 and 44. Wedge shaped portions 124 and 126 engage outer rings 56 and 58 to center and align the bearings, isolating them from the housing.

These embodiments result in many advantages over the prior art. The large chamfer on the outer race that mates with a matching angled step in the housing bore eliminates the need for the press fit while still meeting the application requirements. These designs can reduce the rotational effort and torque variation of the system and facilitate assembly. The mating tapers give the bearing freedom to self-align and thereby avoid common "clicking" noise. Also, a secondary machining operation on the housing bore, end grinding of the outer ring, and a formed counterbore in the outer ring can, potentially, be eliminated.

Having described the invention, what is claimed is:

1. A steering column assembly comprising:

a housing having a bore with first and second bearing seats axially spaced along an axis, each bearing seat being tapered such that the diameter of the bore tapers radially inwardly in the axially inward direction;

first and second angular contact bearings having first and second outer rings seated on the first and second bearing seats, respectively, and having first and second inner rings, respectively;

a shaft extending through the bore of the housing and having a third tapered bearing seat located such that one of the first and second inner rings is seated on the third tapered bearing seat; and biasing means mounted on a reduced diameter portion of the shaft for biasing said other of the first and second inner rings axially inwardly such that the first and second angular contact bearings are preloaded and are axially aligned with the three tapered bearing seats.

2. The steering column assembly according to claim 1, wherein the biasing means includes a helical spring positioned over the shaft and engaging a tolerance ring.

3. The steering column assembly according to claim 1, wherein the biasing means includes a mounting ring of elastomeric polymer positioned over the shaft and engaging said other of the first and second inner rings.

4. The steering column assembly according to claim 1, wherein the third tapered bearing seat is formed of an elastomeric polymer positioned over the shaft.

5. The steering column assembly according to claim 1, further comprising a fourth tapered bearing seat, movably mounted on the shaft such that the biasing means biases the fourth tapered bearing seat axially inwardly.

6. The steering column assembly according to claim 1, further comprising a layer of elastomeric polymer between at least one of the tapered bearing seats and the respective angular contact bearing.

7. The steering column assembly according to claim 1, wherein at least one of the inner bearing rings has a tapered surface corresponding to the tapered bearing seat on which it is seated.

8. The steering column assembly according to claim 1, wherein at least one of the outer bearing rings has a tapered surface corresponding to the tapered bearing seat on which it is seated.

9. The steering column assembly according to claim 1, wherein at least one of the inner bearing rings has a rounded surface engaging an intermediate diameter of the tapered bearing seat on which it is seated.

10. The steering column assembly according to claim 1, wherein at least one of the outer bearing rings has a rounded surface engaging an intermediate diameter of the tapered bearing seat on which it is seated.

11. A steering column assembly comprising:

a housing having a bore with first and second bearing seats axially spaced along an axis each bearing seat being tapered such that the diameter of the bore tapers radially inwardly in the axially inward direction;

first and second angular contact bearings having first and second outer rings seated on the first and second bearing seats, respectively, and having first and second inner rings, respectively;

a shaft extending through the bore of the housing and having a third bearing seat tapered radially inwardly in a direction toward the axial center of the housing such that one of the first and second inner rings is seated on the third bearing seat; and biasing means for biasing at least one of the first and second angular contact bearings such that the first and second angular contact bearings are preloaded and are axially aligned with the three bearing seats.

12. The steering column assembly according to claim 11, wherein one of the first and second bearing seats is movably mounted on the housing and wherein the biasing means biases said bearing seat axially outwardly against the outer ring of the angular contact bearing seated on said bearing seat.

13. The steering column assembly according to claim 12, wherein the biasing means is a helical spring mounted on the housing between the first and second bearing seats.

14. The steering column assembly according to claim 11, wherein at least one of outer rings has a tapered surface corresponding to the respective bearing seat.

15. The steering column assembly according to claim 11, wherein at least one of the inner rings has a tapered surface corresponding to the respective bearing seat.

16. The steering column assembly according to claim 11, wherein at least one of the outer rings has a rounded surface engaging an intermediate diameter of the respective bearing seat.

17. The steering column assembly according to claim 11, wherein at least one of the inner rings has a rounded surface engaging an intermediate diameter of the respective bearing seat.

18. The steering column assembly according to claim 11, wherein at least one of the first and second bearing seats is made of an elastomeric polymer.

19. The steering column assembly according to claim 11, wherein the biasing means is mounted on the reduced diameter portion of the shaft and biases one of the outer rings axially inwardly.

20. The steering column assembly according to claim 11, further comprising a snap ring on the reduced diameter portion of the shaft preventing axially outward movement of said other of the first and second inner rings.

* * * * *